(12) United States Patent
Venter

(10) Patent No.: US 10,082,037 B2
(45) Date of Patent: Sep. 25, 2018

(54) GAS TURBINE HAVING AT LEAST TWO SHAFTS DESIGNED AS HOLLOW SHAFTS AT LEAST IN SOME AREAS AND ARRANGED COAXIALLY RELATIVE TO ONE ANOTHER

(71) Applicant: Rolls-Royce Deutschland Ltd & Co KG, Blankenfelde-Mahlow (DE)

(72) Inventor: Gideon Venter, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 414 days.

(21) Appl. No.: 14/874,831

(22) Filed: Oct. 5, 2015

(65) Prior Publication Data
US 2016/0097292 A1 Apr. 7, 2016

(30) Foreign Application Priority Data
Oct. 6, 2014 (DE) .................. 10 2014 114 473

(51) Int. Cl.
*F01D 11/00* (2006.01)
*F01D 25/16* (2006.01)
(Continued)

(52) U.S. Cl.
CPC ............. *F01D 11/005* (2013.01); *F01D 3/04* (2013.01); *F01D 11/02* (2013.01); *F01D 11/04* (2013.01);
(Continued)

(58) Field of Classification Search
CPC . F01D 11/02; F01D 11/04; F01D 3/04; F01D 25/16; F01D 25/162; F01D 25/183
See application file for complete search history.

(56) References Cited

U.S. PATENT DOCUMENTS 2,779,531 A 1/1957 Wheatley et al.
3,158,413 A 11/1964 Shelley
(Continued)

FOREIGN PATENT DOCUMENTS

CH 308089 A 6/1955
DE 1242942 B 6/1967
(Continued)

OTHER PUBLICATIONS

German Search Report dated Jul. 15, 2015 for related German application No. 10 2014 114 473.2.
(Continued)

*Primary Examiner* — Woody Lee, Jr.
(74) *Attorney, Agent, or Firm* — Shuttleworth & Ingersoll, PLC; Timothy J. Klima

(57) ABSTRACT

The present invention describes a gas turbine having two shafts, which are rotatably mounted using bearing devices in the area of a casing. An intermediate shaft sealing device is arranged between the bearing devices, which includes a sealing element connected to a first shaft, in which a further sealing element connected to the second shaft radially engages. An operating pressure is applied, in the area limited by the shafts in the axial direction of the shafts, to facing effective areas of the sealing elements, while the pressure prevailing in the area outside the shafts in the axial direction acts on effective areas of the sealing elements facing away from one another. A ratio between the outer diameters limiting the facing effective areas and the inner diameters likewise limiting these effective areas is in each case greater than or equal to 1.25.

18 Claims, 1 Drawing Sheet

(51) Int. Cl.
*F01D 25/18* (2006.01)
*F01D 3/04* (2006.01)
*F01D 11/02* (2006.01)
*F01D 11/04* (2006.01)
*F02C 7/28* (2006.01)

(52) U.S. Cl.
CPC ........... *F01D 25/16* (2013.01); *F01D 25/162* (2013.01); *F01D 25/183* (2013.01); *F02C 7/28* (2013.01); *F05D 2220/32* (2013.01); *F05D 2240/50* (2013.01); *F05D 2240/52* (2013.01); *F05D 2240/55* (2013.01); *F05D 2240/56* (2013.01); *F05D 2240/57* (2013.01); *F05D 2240/61* (2013.01); *F05D 2260/15* (2013.01); *F05D 2270/3015* (2013.01)

(56) References Cited

U.S. PATENT DOCUMENTS

| | | | |
|---|---|---|---|
| 3,250,512 | A | 5/1966 | Petrie |
| 4,817,970 | A | 4/1989 | Krauss |
| 5,102,295 | A | 4/1992 | Pope |
| 7,344,139 | B2 | 3/2008 | Gaebler et al. |
| 2006/0267290 | A1* | 11/2006 | Spencer .................. F01D 11/02 277/348 |
| 2014/0099188 | A1* | 4/2014 | Bordne .................. F01D 25/18 415/112 |
| 2015/0097342 | A1* | 4/2015 | Morreale ............. F16J 15/4472 277/417 |

FOREIGN PATENT DOCUMENTS

| | | | | |
|---|---|---|---|---|
| DE | 1300348 | | 7/1969 | |
| DE | 3617279 | A1 | 11/1987 | |
| DE | 4110317 | A1 | 10/1991 | |
| DE | 102009054007 | A1 | 5/2011 | |
| DE | 102011122109 | * | 6/2013 | ............... F16J 15/42 |
| DE | 102011122109 | A1 | 6/2013 | |
| EP | 1626164 | A1 | 2/2006 | |
| EP | 2050932 | A2 | 4/2009 | |
| GB | 786467 | A | 11/1957 | |
| JP | 2009019609 | A | 1/2009 | |

OTHER PUBLICATIONS

European Search Report dated Feb. 25, 2016 for counterpart European application No. 15186107.7.

* cited by examiner

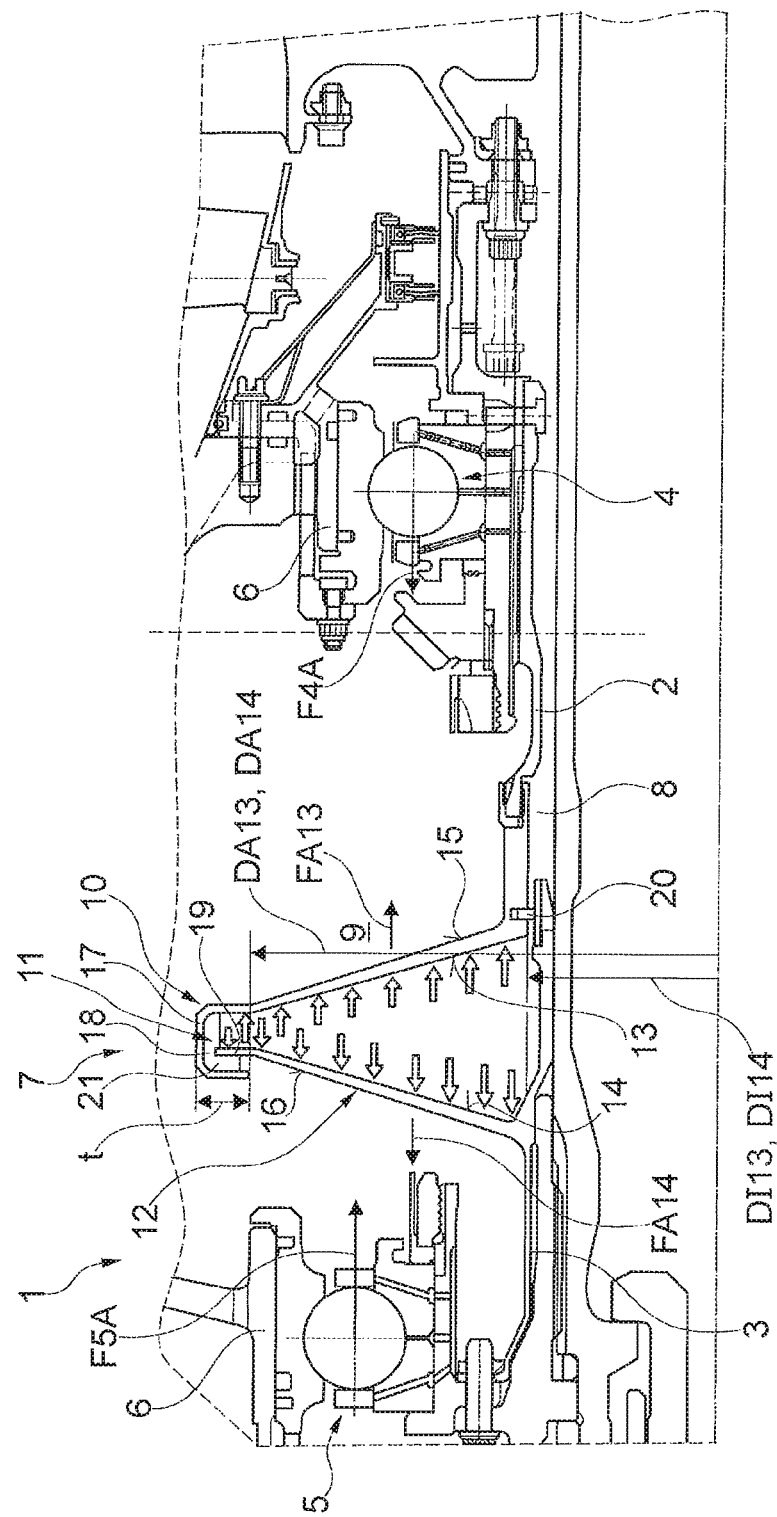

GAS TURBINE HAVING AT LEAST TWO SHAFTS DESIGNED AS HOLLOW SHAFTS AT LEAST IN SOME AREAS AND ARRANGED COAXIALLY RELATIVE TO ONE ANOTHER

This application claims priority to German Patent Application 102014114473.2 filed Oct. 6, 2014, the entirety of which is incorporated by reference herein.

This invention relates to a gas turbine having at least two shafts designed as hollow shafts at least in some areas and arranged to one another.

In gas turbines known from practice and having two or more shafts, aerodynamic loads are braced in the area of the casing structure. In particular, the axial loads acting in the area of the shafts are, in gas turbines designed as aircraft engines, braced in opposite directions in the area of bearing devices. The limited availability of installation space and the high speeds of the shafts, in particular of high-pressure shafts, limit the load-bearing capacity of the high-pressure centering bearings assigned to these shafts.

To permit a reduction of the axial loads in the area of these bearing devices to a permissible level, one option is to provide so-called load pistons which contribute to relief of the bearing devices by means of pressure differences and high-grade seals. To do so, a high pressure acting in a high-pressure area is applied to a load piston of this type, where for example a pressure acting in the area of an engine stage is applied. However, an appropriate sealing effort is required in turn to permit a controlled removal of the airflow supplied to a load piston from an engine stage.

Such sealing devices are either so-called labyrinth seals or so-called brush seals, which are made of carbon. These seals are designed mostly as contact-free seals, to prevent wear and heat generation in the sealing area, said contact-free seals having the disadvantageous characteristic of a certain leakage rate.

The use of special load pistons to reduce the resulting individual axial bearing loads causes a greater sealing diameter with corresponding leakage via associated sealing devices, which however increases both engine fuel consumption and the installation space requirement. In addition, each bearing must be assigned a separate load piston for bearing load reduction, which in turn increases the installation space required by a gas turbine or by an aircraft engine.

Since the temperature of the working fluid in a gas turbine is known to increase with the pressure, and the leakage of hot air affects or alters the material properties of the oil used and also the oil temperatures, additional cooling measures must be provided when load pistons are used, and these measures cause in turn a rise in the total weight of a gas turbine.

Due to the disadvantages entailed by load pistons, bearing devices of gas turbines or aircraft engines are, in view of the circumstances, operated at high loads and therefore have to be replaced after short operating times to prevent any functional failure within a service interval, which in turn however results in an increase in the maintenance and operating costs.

If the bearing devices of the various shafts are arranged in a common bearing chamber, so-called intermediate shaft seals are provided to prevent the entry of hot gases into the bearing chamber and any oil leakage emanating from the bearing chamber in the direction of hot engine areas, inside which oil is ignited due to the high temperatures. Such intermediate shaft seals are provided in gas turbines or aircraft engines with unidirectional shafts as hydraulic intermediate shaft seals. A seal of this type is known for example from DE 10 2009 054 007 A1.

Intermediate shaft sealing devices separate a first area provided inside at least one of the shafts and limited by said shafts from an area provided outside the shafts, where in the area limited by the shafts an operating pressure prevails that differs from the operating pressure acting in the area outside the shafts. The intermediate shaft sealing devices each have a sealing element connected to a first shaft, extending over the circumference of the first shaft and including an inner groove area with a defined groove depth, in which a further sealing element connected to the second shaft radially engages. The operating pressure is applied, in the area limited by the shafts in the axial direction of the shafts, to facing effective areas of the sealing elements, while the pressure prevailing in the area outside the shafts in the axial direction acts on effective areas of the sealing elements facing away from one another.

In aircraft engines, the intermediate shaft area or the area inside the shafts is subjected to a higher pressure than the area outside the shafts, which is usually a bearing chamber. This ensures that in the event of a failure of the sealing effect of an intermediate shaft seal any leakage will flow in the direction of the bearing chamber and any oil loss emanating from the bearing chamber in the direction of a high pressure area is prevented.

The object underlying the present invention is therefore to provide a gas turbine favourable in terms of installation space and cost and also characterized by a low maintenance requirement.

It is a particular object to provide a solution to the above problems by a gas turbine having features as disclosed herein.

The gas turbine in accordance with the invention, which can in particular be an aircraft engine, has at least two shafts designed as hollow shafts at least in some areas and arranged coaxially relative to one another, which shafts are rotatably mounted using bearing devices in the area of a casing. A hydraulic intermediate shaft sealing device is arranged between the bearing devices of the shafts, which separates a first area provided inside at least one of the shafts and limited by said shafts from an area provided outside the shafts. In the area limited by the shafts an operating pressure prevails that differs from the operating pressure acting in the area outside the shafts. The intermediate shaft sealing device includes a sealing element connected to a first shaft, extending over the circumference of the first shaft and having an inner groove area with a defined groove depth, in which a further sealing element connected to the second shaft radially engages. The operating pressure is applied, in the area limited by the shafts in the axial direction of the shafts, to facing effective areas of the sealing elements, while the pressure prevailing in the area outside the shafts in the axial direction acts on effective areas of the sealing elements facing away from one another.

In accordance with the invention, a ratio between the outer diameters limiting the facing effective areas and the inner diameters likewise limiting these effective areas is in each case greater than or equal to 1.25.

With the diameter ratio in accordance with the invention, appropriately large-dimensioned surfaces or front faces are provided in the area of an intermediate shaft sealing device in a manner that is favourable in terms of installation space and cost, on which surfaces the operating pressure acting in the area limited by the shafts is applied such that axial forces are introduced by the operating pressure in the area limited by the shafts into the shafts which are opposite the axial bearing forces acting in the area of the bearing devices and which in operation reduce the axial forces acting in the area of the bearing devices. With the axial pressure forces generated in the area of the intermediate shaft sealing device, axial bearing forces of the shafts can be at least partially compensated and bearing devices can be operated with longer maintenance intervals.

If a groove bottom of the inner groove area is, in the radial direction, at a distance from the radially outer area of the further sealing element, the area limited by the shafts and the area provided outside the shafts can be separated/sealed off from one another with minor losses during operation of the gas turbine by the intermediate shaft sealing device.

If during operation of the gas turbine the radially outer area of the further sealing element dips into a defined oil volume in the inner groove area of the sealing element, any leakage between the area limited by the shafts and the area outside the shafts is substantially equal to 0, without causing high performance losses or causing undesirably high wear in the area of the intermediate shaft sealing device.

With a development of the gas turbine in accordance with the invention that is of simple design, cost-effective and characterized by a high sealing effect, the further sealing element is designed at least in some areas as an annular disk.

If the bearing devices are arranged inside a bearing chamber corresponding to the area outside the shafts, any ingress of oil emanating from the area outside the shafts in the direction of the area limited by the shafts is prevented to the required extent.

If a piston ring is provided between the shafts, which separates while the shafts are stationary the area outside the shafts and the area limited by the shafts on that side of the intermediate shaft sealing device facing the area limited by the shafts, any ingress of oil into the area limited by the shafts is prevented in a simply designed manner also when the gas turbine is stationary.

In a further advantageous embodiment of the gas turbine, the shafts rotate in the same rotational direction, so that speed differences between the sealing element and the further sealing element or between the shafts are less than with counter-rotating shafts, and performance losses and wear in the area of the intermediate shaft sealing device are low.

In detail, the invention relates to a gas turbine in an embodiment with two, three or more shafts, where the gas turbine can be designed in particular in the form of an aircraft gas turbine or jet engine or aircraft engine.

Both the features stated in the patent Claims and the features stated in the following exemplary embodiment of the gas turbine in accordance with the invention, are each suitable, singly or in any combination with one another, to develop the subject matter of the invention.

Further advantages and advantageous embodiments of the subject matter become apparent from the patent Claims and the exemplary embodiment described in principle in the following with reference to the accompanying drawing.

The sole FIGURE of the drawing shows a schematized longitudinal sectional view in partial representation of an exemplary embodiment of the gas turbine in accordance with the present invention.

The FIGURE shows a longitudinal sectional view in partial representation of a gas turbine 1 designed as aircraft engine having two shafts 2, 3 designed as hollow shafts at least in some areas and arranged coaxially relative to one another, which shafts are rotatably mounted using bearing devices 4, 5 in the area of a casing 6. A hydraulic intermediate shaft sealing device 7 is arranged between the bearing devices 4, 5 of the shafts 2, 3, which separates a first area 8 provided inside at least one of the shafts 2 and limited by the shafts 2, 3 from an area 9 provided outside said shafts, which area in the present case represents a bearing chamber of the bearing devices 4 and 5.

The operating pressure acting in the area of the bearing chamber 9 during operation is lower than the operating pressure acting in the area 8 limited by the shafts 2, 3, thus ensuring that even in the event of a failure of the sealing effect in the area of the intermediate shaft sealing device 7 any entry of oil emanating from the bearing chamber 9 in the direction of the area 8 is prevented. The area 8 is connected to the high pressure area of the jet engine 1, in the area of which such high operating temperatures prevail during operation of the jet engine 1 that oil present in the area 8 is ignited, which is however undesirable.

The intermediate shaft sealing device 7 includes a sealing element 10 connected to the shaft 2 or to the high-pressure shaft, respectively, and extending over the circumference of the first shaft 2 as well as an inner groove area 11 with a defined groove depth t. A further sealing element 12 of the intermediate shaft sealing device 7 connected to the second shaft 3 radially engages the inner groove area 11. The operating pressure is applied, in the area 8 limited by the shafts 2, 3 in the axial direction of the shafts 2, 3, to facing effective areas 13, 14 of the sealing elements 10, 12, while the pressure prevailing in the area 9 outside the shafts 2, 3 in the axial direction acts on effective areas of the sealing elements 10, 12 facing away from one another.

A groove bottom 17 of the inner groove area 11 is arranged in the radial direction, at a distance from the radially outer area of the further sealing element.

To permit, during operation of the aircraft engine 1, a sealing separation to the required extent of the bearing chamber 9 from the area 8 by means of the intermediate shaft sealing device 7, an oil volume flow is introduced into the inner groove area 11 during operation of the jet engine 1. Depending on the pressure drop between the bearing chamber 9 and the area 8 and on the speeds of the unidirectionally rotating shafts 2 and 3, a defined oil volume 21 is present in the inner groove area 11 without any further measures and is maintained there by the centrifugal force acting on the oil due to the rotation, where due to a continuous supply of oil into the inner groove area 11 the oil volume present there is continually replaced, hence preventing any unwelcome heating up of the oil in the inner groove area 11.

Depending on the pressure drop between the bearing chamber 9 and the area 8, a different oil level is obtained in the inner groove area 11 on that side of the sealing element 12 facing the bearing device 5 than on that side of the sealing element 12 facing the bearing device 4. This results from the fact that the pressure in the area 8 is higher than in the area of the bearing chamber 9.

To ensure an appropriately high sealing effect, the further sealing element 12, in its outer rim area 19 arranged in the inner groove area 11, is designed in annular disk form and substantially parallel to the areas of the first sealing element 10 limiting the inner groove area 11. In addition, during operation of the gas turbine 1, the further sealing element 12 dips into the defined oil volume 21 with a radially outer area 18 of the rim area 19 inside the inner groove area 11 of the sealing element 10. As a result, any leakage between the area 8 limited by the shafts 2, 3 and the area 9 outside the shafts 2, 3 is substantially equal to 0, without causing high performance losses or causing undesirably high wear in the area of the intermediate shaft sealing device 7.

In addition, a piston ring 20 is provided between the shafts 2 and 3, which separates, while the shafts 2, 3 are stationary, the area or the bearing chamber 9 outside the shafts 2, 3 and the area 8 limited by the shafts 2, 3 on that side of the intermediate shaft sealing device facing the area 8 limited by the shafts 2, 3, in order to prevent any ingress of oil emanating from the bearing chamber 9 into the area 8 while the shafts 2, 3 are stationary and when the aircraft engine 1 is switched off. During operation, i.e. while the shafts 2, 3 are rotating, the piston ring 20 lifts off from the shaft 3, so that the piston ring 20 is then no longer contacting the outside of the shaft 3, and undesirable performance losses in this area are prevented during operation of the aircraft engine 1.

The structural design of the aircraft engine 1 according to the FIGURE is such that in the zone of the bearing device 4, in the area of which the high-pressure shaft 2 is rotatably mounted, an axial force component F4A prevails at the current operating point, which must be braced by the bearing device 4 in the casing 6 and which acts in the area of the bearing device 4 in the direction of the intermediate shaft sealing device 7. At the same time, an axial force component F5A likewise acting in the direction of the intermediate shaft sealing device 7 acts in the zone of the bearing device 5, in the area of which the low-pressure shaft 3 is rotatably mounted. The two axial force components F4A and F5A are those axial forces made up of all axial forces acting on the shafts 2 and 3.

In order to prevent, in the area of the bearing devices 4 and 5, resulting axial force components F4A, F5A that are inadmissibly high and that reduce a required long service life of the bearing devices 4, 5, a ratio between the outer diameters DA13/DA14 limiting the facing effective areas and the inner diameters DI13/DI14 likewise limiting these effective areas 13, 14 is in each case greater than or equal to 1.25. In this case, the inner diameters DI13 and DI14 of the effective areas 13 and 14 of the sealing elements 10, 12 of the intermediate shaft sealing device 7 in the exemplary embodiment of the jet engine 1, considered in more detail here, substantially correspond to inner diameters in the area of intermediate shaft sealing devices in conventional aircraft engines, while the outer diameters DA13 and DA14 of the effective areas 13 and 14 are enlarged to the extent in accordance with the invention when compared with conventionally designed aircraft engines. Hence the solution in accordance with the invention can be implemented to a minor extent in existing engine concepts, in order to permit application of the respectively resulting axial forces FA13 and FA14, in the zone of the bearing device 4 and also of the bearing device 5, from the pressure applying in the zone of the effective areas 13 and 14 of the area 8 limited by the shafts 2, 3, which forces counteract the resulting axial force components F4A and F5A respectively and reduce the axial bearing load in the area of the bearing devices 4 and 5 to the required extent.

Depending on the application in question, however, it is also possible to design the inner diameters DI13 and DI14 in a different suitable manner in order to provide the previously described axial bearing force compensation with the diameter ratio greater than or equal to 1.25.

The pressure difference between the operating pressure in the bearing chamber 9 and the operating pressure in the area 8 varies over the operating range of the jet engine 1 and, among others, also depending on the flight altitude, flight speed and the like, which also affects the height of the axial force components FA13 and FA14. Generally speaking, however, it is possible to set the axial force compensation in the area of the bearing devices 4 and 5 by appropriate design of the outer diameters DA13 and DA14 and of the inner diameters DI13 and DI14, and of the operating pressures of the bearing chamber 9 and of the area 8 applying respectively in the zone of the effective areas 13/14 and 15/16 of the intermediate shaft sealing device 7, and the sealing elements 10 and 12.

With the specified procedure for axial bearing force compensation in the area of the bearing devices 4 and 5, the axial bearing forces in the area of the bearing devices 4 and 5 can be limited with minor effects on the weight of the jet engine, without increasing a fuel consumption of the jet engine 1. Furthermore, undesirable temperature increases too of oil present in the area of the bearing chamber 9 are avoided, since the hydraulic intermediate shaft sealing device 7 exhibits substantially no leakage. Generally speaking, axial bearing compensation in the area of the intermediate shaft sealing device 7 can be achieved, by means of the diameter ratio in accordance with the invention between the outer diameter DA13 and the inner diameter DI13 and between the outer diameter DA14 and the inner diameter DI14 with the pressure drop currently present in conventionally designed jet engines between the bearing chamber 9 and the area 8 limited by the shafts 2, 3.

Setting and/or dimensioning in accordance with the invention of the outer diameter DA13/DA14 in the area of the intermediate shaft sealing device 7 effects an improvement of the sealing effect in the area of the intermediate shaft sealing device 7, since the centrifugal force acting on the oil introduced or sprayed into the inner groove area 11 when the shafts 2, 3 are rotating is thereby increased and the oil is kept in that position inside the inner groove area 11 which provides the sealing effect of the intermediate shaft sealing device 7.

LIST OF REFERENCE NUMERALS

1 Gas turbine
2 Shaft, high-pressure shaft
3 Shaft, low-pressure shaft
4 Bearing device of high-pressure shaft
5 Bearing device of low-pressure shaft
6 Casing
7 Intermediate shaft sealing device
8 Area limited by the shafts
9 Bearing chamber area
10 Sealing element
11 Inner groove area
12 Further sealing element
13 Effective area of sealing element
14 Effective area of further sealing element
15 Effective area of sealing element
16 Effective area of further sealing element
17 Groove bottom
18 Radially outer area
19 Rim area of further sealing element
20 Piston ring
21 Oil volume
DA 13, DA 14 Outer diameter of effective areas
DI 13, DI 14 Inner diameter of effective areas
F4A, F5A Axial force component
FA 13, FA 14 Axial force
t Groove depth

What is claimed is:
1. A gas turbine comprising:
a casing;
bearing devices supported by the casing;

two shafts, each of the two shafts being hollow in some areas, the two shafts being arranged coaxially relative to one another, the two shafts being rotatably mounted in the casing by the bearing devices, a hydraulic intermediate shaft sealing device arranged between the bearing devices and which separates a first area inside at least one of the two shafts and limited by the two shafts from a second area outside the two shafts, where, in the first area, a first operating pressure prevails that differs from a second operating pressure acting in the second area, the hydraulic intermediate shaft sealing device including a first sealing element connected to a first shaft of the two shafts, the first sealing element extending over a circumference of the first shaft, and including an inner groove area with a defined groove depth, a second sealing element connected to a second shaft of the two shafts and radially engaging the inner groove area, where the first operating pressure is applied in the first area in an axial direction of the two shafts to facing effective areas of the first and second sealing elements, with each facing effective area being radially limited by an outer diameter and an inner diameter, each outer diameter and each inner diameter positioned on a respective one of the first and second sealing elements, while the second operating pressure prevailing in the second area acts in the axial direction on effective areas of the first and second sealing elements facing away from one another, where a ratio between the outer diameters of the facing effective areas of the first and second sealing elements and the inner diameters of the facing effective areas of the first and second sealing elements is in each case greater than or equal to 1.25.

2. The gas turbine in accordance with claim 1, wherein the inner groove area includes a groove bottom, in a radial direction, at a distance from a radially outer area of the second sealing element.

3. The gas turbine in accordance with claim 2, wherein during operation of the gas turbine, the radially outer area of the second sealing element dips into a defined oil volume in the inner groove area of the first sealing element.

4. The gas turbine in accordance with claim 3, wherein the second sealing element is shaped in some areas as an annular disk.

5. The gas turbine in accordance with claim 4, and further comprising a bearing chamber in which the bearing devices are positioned.

6. The gas turbine in accordance with claim 5, and further comprising a piston ring positioned between the two shafts, which separates, while the two shafts are stationary, the second area and the first area on a side of the hydraulic intermediate shaft sealing device facing the first area.

7. The gas turbine in accordance with claim 6, wherein the two shafts rotate in a same rotational direction.

8. The gas turbine in accordance with claim 2, wherein the second sealing element is shaped in some areas as an annular disk.

9. The gas turbine in accordance with claim 8, and further comprising a bearing chamber in which the bearing devices are positioned.

10. The gas turbine in accordance with claim 9, and further comprising a piston ring positioned between the two shafts, which separates, while the two shafts are stationary, the second area and the first area on a side of the hydraulic intermediate shaft sealing device facing the first area.

11. The gas turbine in accordance with claim 10, wherein the two shafts rotate in a same rotational direction.

12. The gas turbine in accordance with claim 1, wherein the second sealing element is shaped in some areas as an annular disk.

13. The gas turbine in accordance with claim 12, and further comprising a bearing chamber in which the bearing devices are positioned.

14. The gas turbine in accordance with claim 13, and further comprising a piston ring positioned between the two shafts, which separates, while the two shafts are stationary, the second area and the first area on a side of the hydraulic intermediate shaft sealing device facing the first area.

15. The gas turbine in accordance with claim 14, wherein the two shafts rotate in a same rotational direction.

16. The gas turbine in accordance with claim 1, and further comprising a bearing chamber in which the bearing devices are positioned.

17. The gas turbine in accordance with claim 1, and further comprising a piston ring positioned between the two shafts, which separates, while the two shafts are stationary, the second area and the first area on a side of the hydraulic intermediate shaft sealing device facing the first area.

18. The gas turbine in accordance with claim 1, wherein the two shafts rotate in a same rotational direction.

* * * * *